US007174358B2

(12) United States Patent
Kishore et al.

(10) Patent No.: US 7,174,358 B2
(45) Date of Patent: Feb. 6, 2007

(54) SYSTEM, METHOD, AND APPARATUS FOR DIVISION COUPLED WITH TRUNCATION OF SIGNED BINARY NUMBERS

(75) Inventors: Chhavi Kishore, Bangalore (IN); Aniruddha Sane, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 693 days.

(21) Appl. No.: 10/414,580

(22) Filed: Apr. 15, 2003

(65) Prior Publication Data
US 2004/0098441 A1 May 20, 2004

Related U.S. Application Data

(60) Provisional application No. 60/426,504, filed on Nov. 15, 2002.

(51) Int. Cl.
*G06F 7/52* (2006.01)
(52) U.S. Cl. .................. 708/653; 708/551
(58) Field of Classification Search ........ 708/653, 708/551, 497
See application file for complete search history.

(56) References Cited

U.S. PATENT DOCUMENTS

| 4,727,506 | A | * | 2/1988 | Fling ............ 708/551 |
| 5,107,453 | A | * | 4/1992 | Nomura ......... 708/653 |
| 5,365,471 | A | * | 11/1994 | Sato ............ 708/493 |
| 5,754,460 | A | * | 5/1998 | Tam ............ 708/653 |

* cited by examiner

*Primary Examiner*—D. H. Malzahn
(74) *Attorney, Agent, or Firm*—McAndrews, Held & Malloy Ltd.

(57) ABSTRACT

A system, method, and apparatus for dividing and truncating a dividend by a divisor, wherein the magnitude of the divisor is a positive power of two, e.g., $2^x$, is presented herein. If the divisor is positive, the sign bit of the dividend is concatenated x times and added to the dividend. If the divisor is negative, the dividend is inverted, the sign bit of the inverted dividend is concatenated x times, and added to the inverted dividend. The sign bit of the divisor is also added to the sum and the result is right shifted x times. If the signs of the divisor and the dividend are the same, a zero is shifted into the most significant bit during each right shift. If the signs of the divisor and the dividend are different, the most-significant-bit (sign bit) of the result of addition is shifted into the most significant bit during each right shift.

8 Claims, 3 Drawing Sheets

SYSTEM, METHOD, AND APPARATUS FOR DIVISION COUPLED WITH TRUNCATION OF SIGNED BINARY NUMBERS

RELATED APPLICATIONS

The present application claims the priority benefit of U.S. Provisional Patent Application Ser. No. 60/426,504, entitled "Algorithm for Division Coupled with Truncation of Signed Binary Numbers", by Kishore, et. al., filed Nov. 15, 2002. This application is also related to "Algorithm for Division Coupled with Rounding of Signed Binary Numbers", Application Ser. No. 10/414,842, by Kishore, et. al., filed Apr. 15, 2003.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Various applications require truncation of signed numbers divided by an integer power of two, e.g., 1, 2, 4, 8, 16, etc. Truncation implies integer division with truncation of the result toward 0. For example, 3/2 is truncated to 1, while −3/2 is truncated to −1.

Truncation of unsigned numbers can be achieved by the right shift operation. The number of times right shift has to be performed is equal to the $\log_2$ of the denominator. For example, if 13 (01101) is to be truncated by four, $\log_2 4=2$ (10), 01101 is right shifted twice, resulting in 11, or three.

Although the foregoing scheme works for unsigned binary numbers, it does not yield correct results for signed binary numbers. This is because of the fact that in two's complement representation of signed binary numbers, the sign bit (most significant bit) of the numbers carries a negative weight. Thus if 10011 (−13) has to be truncated by 100 (4), the result should be −3. However, the foregoing scheme results in 100 (4).

One way to achieve truncation of signed binary numbers is to convert the signed number to unsigned numbers (preserving the sign information), truncate the unsigned numbers, and apply to sign information. The foregoing adds additional steps of converting each signed number to unsigned number, requiring more processing, and more time.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

A method for dividing and truncating a dividend by a divisor, wherein the magnitude of the divisor is a positive power of two, e.g., $2^x$, is presented herein. If the divisor is positive, the sign bit of the dividend is concatenated x times and added to the dividend. If the divisor is negative, the dividend is inverted, the sign bit of the inverted dividend is concatenated x times, and added to the inverted dividend. The sign bit of the divisor is also added to the sum and the result is right shifted x times. If the signs of the divisor and the dividend are the same, a zero is shifted into the most significant bit during each right shift. If the signs of the divisor and the dividend are different, the most-significant-bit(sign bit) of the result is shifted into the most significant bit during each right shift.

A circuit for dividing and truncating a dividend by a divisor, wherein the magnitude of the divisor is a positive power of two, e.g., $2^x$, is presented herein. The dividend is received at an input and inverted by an inverter. The dividend and the inverted dividend are received by a switch. The switch selects the dividend or the inverted dividend, based on the sign bit of the divisor. If the sign bit of the divisor is a one, the switch selects the inverse of the dividend. If the sign of the dividend is a zero, the switch selects the dividend. The sign bit of the selection of the switch is concatenated x times and added to the selection of the switch by an adder. The adder also adds the sign bit of the divisor to the selection of the switch and the concatenated sign bit. A shift register right shifts the output of the adder x times and shifts in either a one or a zero into the most significant bit each time. Whether a one or zero is shifted into the shift register is determined by a unit comprising of an exclusive-OR (XOR) gate and an AND gate. The exclusive-OR gate compares the sign bit of the divisor and the dividend. The output of the exclusive or gate is provided with the most-significant-bit (sign bit) of the result of the adder to the AND gate. The output of the AND gate is shifted into the shift register during each right shift.

An encoder for encoding data is presented herein. The encoder includes a discrete cosine transfer engine, a quantizer, a zig-zag scanner, and a Huffman decoder. The quantizer either implements the method presented herein or incorporates the circuit presented herein.

These and other advantages and novel features of the embodiments in the present application will be more fully understood from the following description and in connection with the drawings.

DETAILED DESCRIPTION OF THE INVENTION

Figure 1:
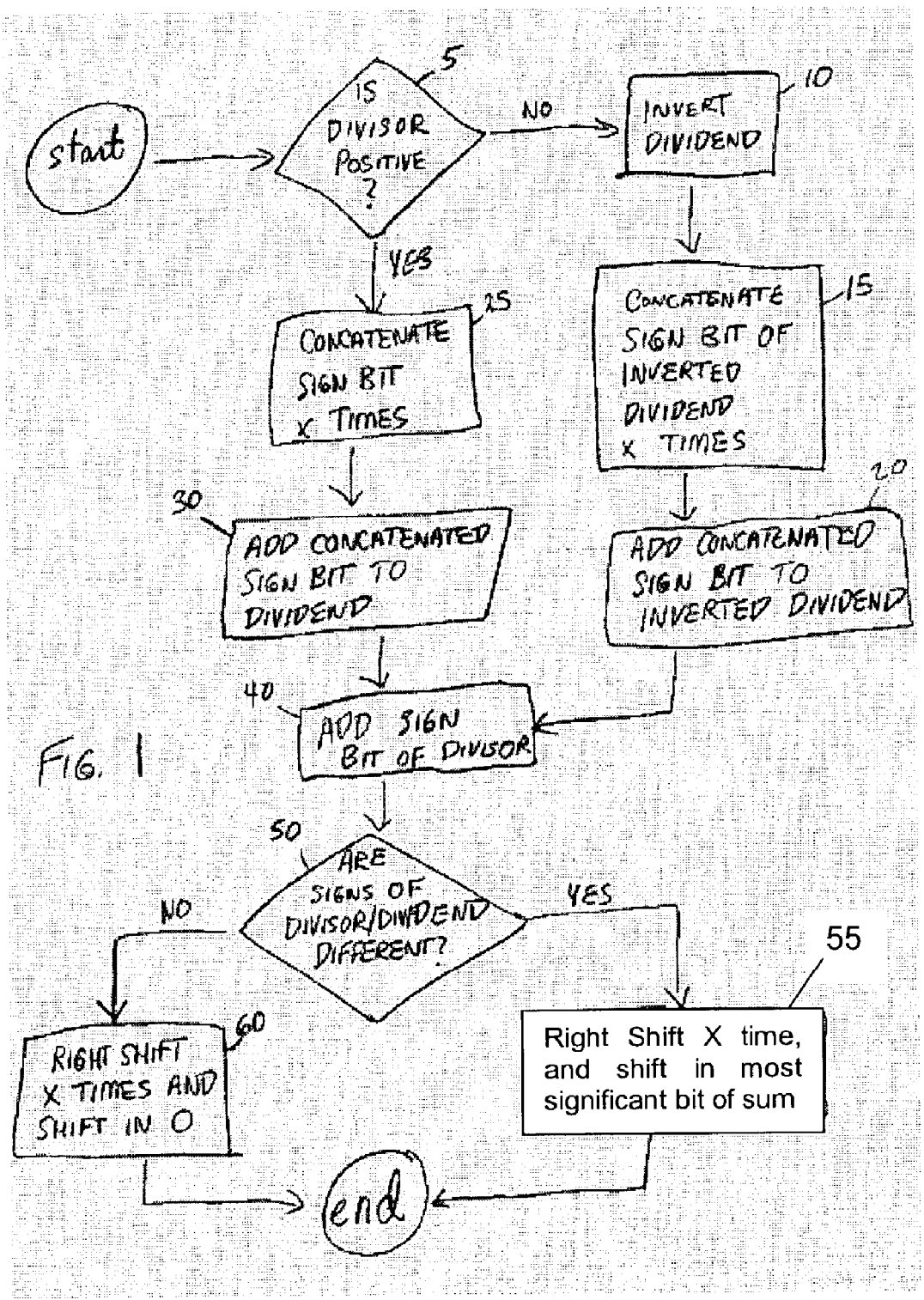
FIG. 1 is a flow diagram for truncating signed numbers in accordance with an embodiment of the present invention.

Referring now to FIG. 1, there is illustrated a flow diagram for truncating a signed integer dividend by a signed integer divisor that is either $2^x$, or $-2^x$, where x is a positive integer. At 5, a determination is made whether the divisor is positive or negative.

If the divisor during 5 is negative, the dividend is inverted (10). The sign bit of the inverted dividend is concatenated (15) x times. For example, if the sign bit of the inverted dividend is a "1", and x=3, the sign bit is concatenated three times, resulting in 111. The concatenated sign bit of the inverted dividend is then added to the inverted dividend at (20).

If the divisor during 5 is positive, the sign bit of the dividend is concatenated x times (25). For example, if the sign bit of the dividend is a "1", and x=3, the sign bit is concatenated three times, resulting in 111. The concatenated sign bit of the dividend is then added to the dividend at (30).

At 40, the sign bit of the divisor is added to the result during either 30 or 20. At 50, a determination is made whether the signs of the divisor and dividend are the same or different. If the signs are different, the result of 45 is right shifted x times, and a most-significant-bit (sign bit) of the result of 45 is shifted (55) into the most significant bit during each shift. If the signs are the same, the result of 45 is right shifted x times, and a "0" is shifted (60) into the most significant bit during each shift.

Figure 2:
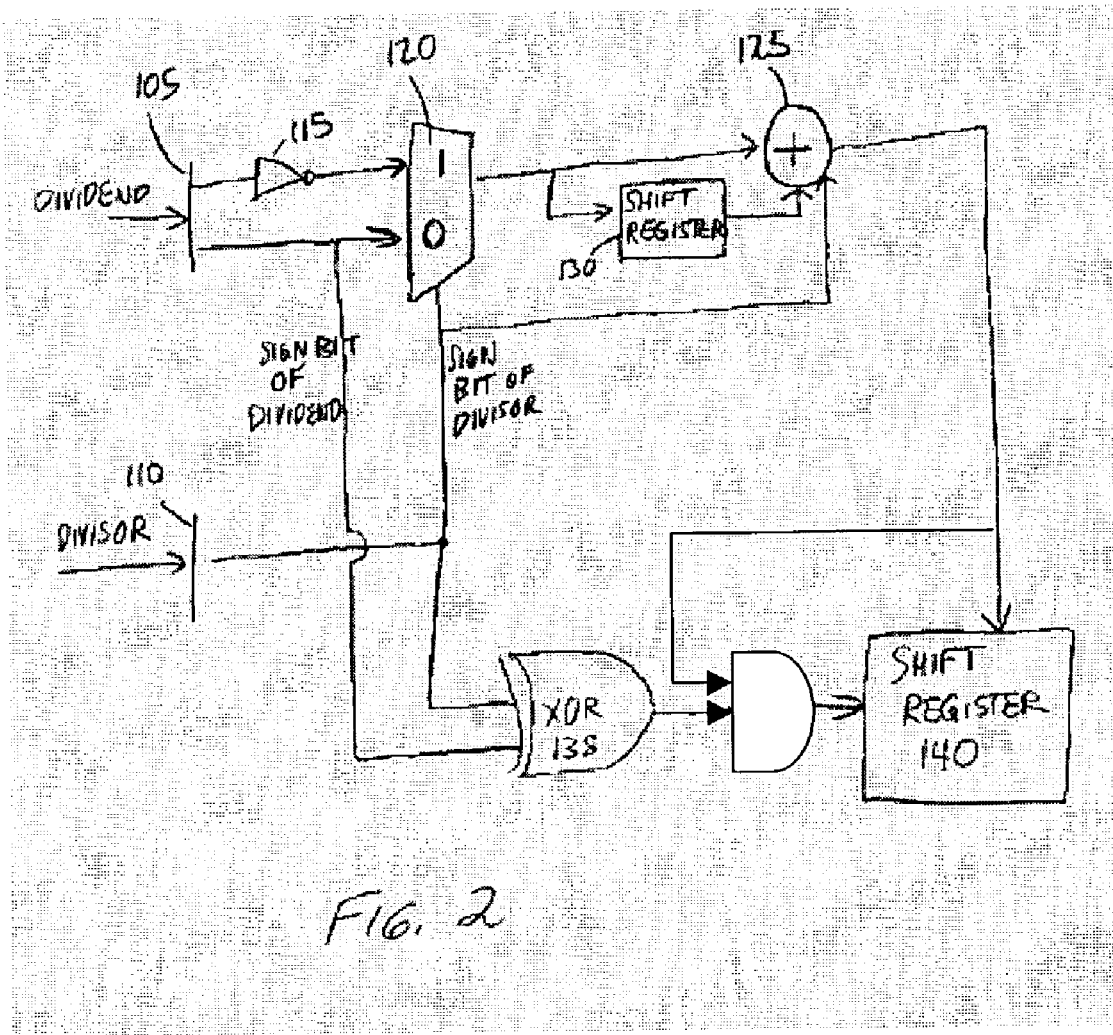
FIG. 2 is a circuit for truncating signed numbers in accordance with an embodiment of the present invention.

Referring now to FIG. 2, there is illustrated a block diagram of an exemplary circuit for truncating a signed integer dividend by a signed integer divisor which is either $2^x$, or $-2^x$, where x is a positive integer. The circuit includes an input for the dividend 105 and the divisor 110. The input for the dividend 105 is connected to an inverter 115 for inverting the dividend. The dividend and the inverted dividend are received at a switch 120. The switch 120 selects either the dividend or the inverted dividend and is controlled by the sign bit of the divisor. If the sign bit of the divisor is a "0", the switch selects the dividend. If the sign bit of the divisor is a "1", the switch selects the inverted dividend.

The switch 120 provides the selection to an adder 125. Additionally, the switch 120 provides the sign bit of the selection to a shift register 130. The single bit shift register 130 achieves x times concatenation of the sign bit of the selection. The adder 125 also receives the sign bit from the divisor from input 110 and adds the selection from the switch 120, the sign bit from the divisor from input 110 and the output of the single bit shift register 130.

The circuit also includes an XOR gate 138. The XOR gate 138 receives the sign bits of both the divisor and the dividend. Where the bits match (both 0, or both 1), the output of the XOR gate 138 is a 0. Where the bits are different, the output of the XOR gate 138 is a 1.

The output of the XOR gate 138 goes as input to a two input AND gate, the other input of which is the most-significant-bit (sign bit) of the result of adder 125.

A shift register 140 receives the output of the adder 135 and the AND gate as inputs. The shift register 140 loads the output of the adder 135 and right shifts x times. During each shift, the least significant bit of the shift register 140 is shifted out. Additionally, during each shift, the output of the AND gate is shifted in as the most significant bit. After the foregoing, the contents of the shift register 140 are the dividend truncated by the divisor.

Truncating a signed number divided by a signed number power of two is used in a variety of applications, including digital compression. During MPEG compression, many steps include truncating the data by a power of two.

Figure 3:
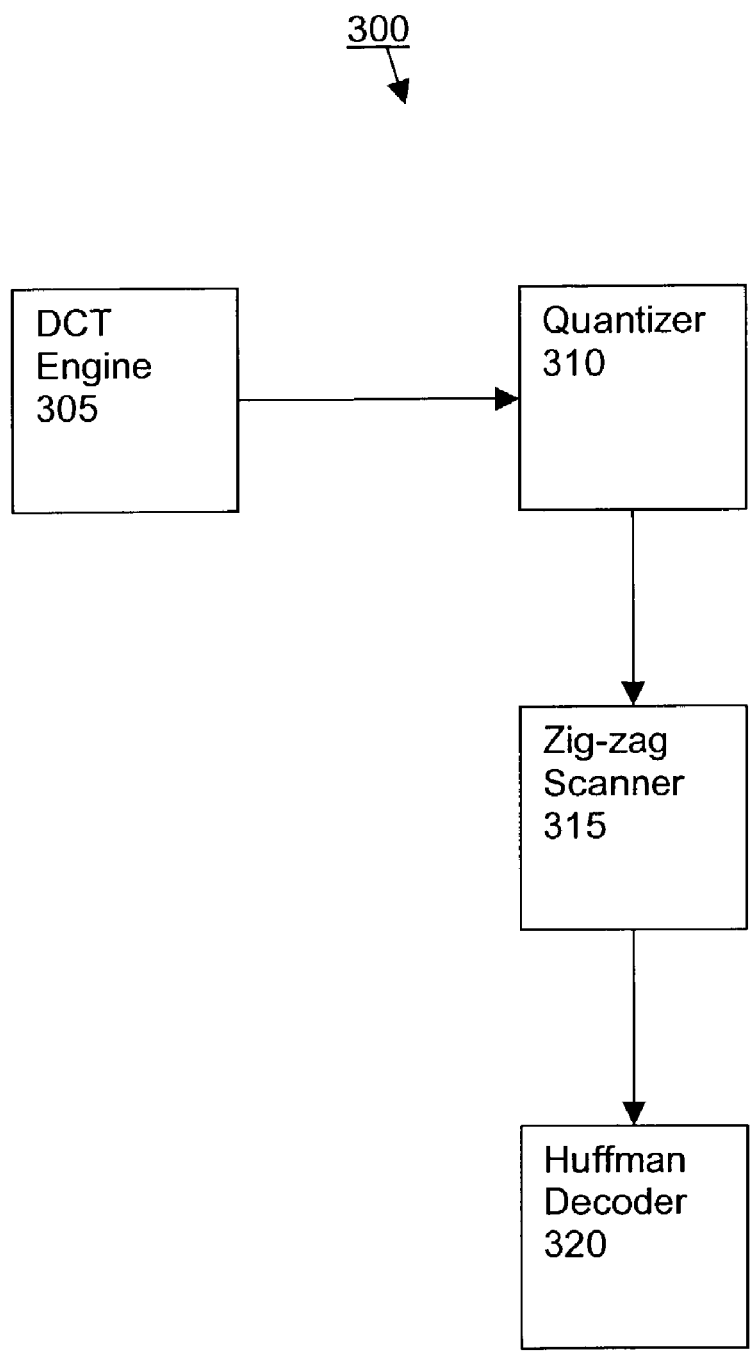
FIG. 3 is a decoder configured in accordance with an embodiment of the present invention.

Referring now to FIG. 3, there is illustrated an exemplary MPEG video encoder 300 wherein the present invention can be practiced. The encoder comprises a DCT engine 305, a quantizer 310, a zig-zag scanner 315, and a Huffman Decoder 320. The DCT engine 305 receives image data and converts the image data from the spatial domain to the frequency domain.

The image data in the frequency domain is represented by a matrix of coefficients 325, each of which correspond to particular frequencies. The quantizer 310 receives the matrix of coefficients 325 and quantizes the matrix of coefficients 325. Because human vision is less discriminating to contribution of higher frequency coefficients, the higher frequency coefficients can be represented with less accuracy without significant noticeable distortion. Accordingly, the higher frequency coefficients are represented by fewer bits while the lower frequency coefficients are represented by more bits.

The quantizer 310 represents the coefficients by quantized value and a scale factor. The scale factor is $2^x$, or $-2^x$, wherein x is an integer. For higher frequencies, x is higher, while for lower frequencies, x is lower. To determine the quantized value, the coefficients 325 are divided by the scale factor and truncated. The quantizer 310 can incorporate the circuit described in FIG. 2, or implement the flow diagram of FIG. 1 to divide and truncate the coefficients 325 by the scale factor.

The output of the quantizer 310 is provided to the zig-zag scanner 315. The zig-zag scanner 315 scans the quantized coefficients diagonally starting from the top left corner and ending at the bottom right corner. The output of the zig-zag scanner 315 is provided to the Huffman encoder 320. The Huffman encoder 320 encodes the scanned quantized coefficients using a variable length code.

One embodiment of the present invention may be implemented as a board level product, as a single chip, application specific integrated circuit (ASIC), or with varying levels integrated on a single chip with other portions of the system as separate components. The degree of integration of the monitoring system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A circuit for dividing a dividend by a divisor, wherein the divisor is an integer power of two, said circuit comprising:
   an input for receiving the dividend;
   an inverter for inverting the dividend;
   a switch for selecting the dividend or the inverted dividend;
   an input for receiving the divisor; and
   wherein the switch is controlled by a sign bit associated with the divisor, wherein the switch selects the dividend if the sign bit associated with the divisor indicates that the divisor is positive, and wherein the switch selects the inverted dividend if the sign bit associated with the divisor indicates that the divisor is negative.

2. The system of claim 1, further comprising:
   a first shift register for shifting a sign bit associated with the selection of the switch; and
   an adder for adding the selection of the switch, the shifted sign bit associated with the selection of the switch, and a sign bit associated with the divisor, thereby providing a sum.

3. The circuit of claim 2, further comprising:
a second shift register for right shifting the sum of the adder the integer power of two times.

4. The circuit of claim 3, further comprising:
an exclusive OR gate for comparing the sign bit of the divisor to the sign bit of the dividend;
an AND gate for outputting the product of the exclusive OR gate and a most significant bit of the sum; and
wherein the second shift register shifts in an output of the AND gate during each right shift.

5. A circuit for dividing a dividend by a divisor, wherein the magnitude of the divisor is a positive integer power of two, said circuit comprising:
a first input receiving the dividend;
an inverter connected to the first input;
switch connected to the first input and the inverter;
a first shift register connected to the switch;
an adder connected to the first shift register and the switch; and
a second input receiving the divisor and connected to the switch.

6. The circuit of claim 5, further comprising:
an exclusive OR gate connected to the first input and the second input.

7. The circuit of claim 6, further comprising:
an AND gate connected to the output of the exclusive OR gate;
a second shift register connected to the output of the AND gate.

8. An encoder for encoding data, said encoder comprising:
a discrete cosine transformation engine for transforming the data to the frequency domain; and
a quantizer for quantizing the data in the frequency domain, the quantizer further comprising a circuit for dividing a dividend by a divisor, wherein the magnitude of the divisor is an integer power of two, the circuit comprising:
an input for receiving the dividend;
an inverter for inverting the dividend;
a switch for selecting the dividend or the inverted dividend;
an input for receiving the divisor; and
wherein the switch is controlled by a sign bit associated with the divisor, wherein the switch selects the dividend if the sign bit associated with the divisor indicates that the divisor is positive, and wherein the switch selects the inverted dividend if the sign bit associated with the divisor indicates that the divisor is negative.

* * * * *